United States Patent [19]

Usui

[11] Patent Number: 4,979,606
[45] Date of Patent: Dec. 25, 1990

[54] TRANSPORTING DIRECTION CONTROLLING DEVICE IN CONVEYOR SYSTEM

[75] Inventor: Motosuke Usui, Shinagawa, Japan

[73] Assignee: Sony Corporation, Tokyo, Japan

[21] Appl. No.: 243,230

[22] Filed: Sep. 6, 1988

Related U.S. Application Data

[63] Continuation of Ser. No. 31,707, Mar. 30, 1987, abandoned.

[30] Foreign Application Priority Data

Jun. 13, 1986 [JP] Japan .................. 61-137718

[51] Int. Cl.⁵ .............................................. B65G 47/46
[52] U.S. Cl. ...................................... 198/369; 198/782; 198/787; 193/35 MD
[58] Field of Search ............... 198/358, 365, 366, 367, 198/782, 787, 369; 193/35 MD

[56] References Cited

U.S. PATENT DOCUMENTS 3,747,736  7/1973  Kornylak ................ 198/365
4,180,150  12/1979  Moore .................... 198/366

FOREIGN PATENT DOCUMENTS

3122849  12/1982  Fed. Rep. of Germany .
62-93118  4/1987  Japan .
0578226  10/1977  U.S.S.R. ................ 198/366
1527491  4/1978  United Kingdom .

Primary Examiner—Joseph E. Valenza
Assistant Examiner—D. Glenn Dayoan
Attorney, Agent, or Firm—Ronald P. Kananen

[57] ABSTRACT

A transporting direction controlling or translating device employs a rotor member having a plane contacting with an object to be transferred. The rotor member is rotatably supported by a rotary shaft which is tiltable in variable directions for tilting the plane. By the tilting direction of the plane and the rotating direction of the rotor member, the transporting direction can be changed. Preferably, the rotor member comprises a substantially cylindrical or disc-shaped roller with the contacting plane. The roller is adapted to contact with the object at a point on the contacting plane. In such case, the force to feed the object is exerted on the object in tangential direction relative to the circular trace of the contacting point. Therefore, by adjusting the position of the contacting point, at which the contacting point comes in contact with the object, transporting direction can be changed.

21 Claims, 12 Drawing Sheets

TRANSPORTING DIRECTION CONTROLLING DEVICE IN CONVEYOR SYSTEM

This application is a continuation of application Ser. No. 07/031,707, filed Mar. 30, 1987 now abandoned.

BACKGROUND OF THE INVENTION

1. Field of the Invention

The present invention relates generally to a conveyer system for transporting objects, such as products, parts and so forth. More specifically, the invention relates to a conveyer system employing a novel transporting direction controlling device which is useful for controlling transporting direction.

2. Description of the Background Art

Conventionally, various conveyer systems are employed in factories for transporting manufactured products, parts to be assembled into the products, and so forth. In many cases, the transporting paths through which the conveyer systems transport the products, parts and so forth, are not straight. On the other hand, the conveyer systems tend to include junctions to selectively transport the products, parts and so forth through one of a plurality of transporting paths. In such cases, it is required to translate the transporting direction in the conveyer systems.

In order to translate the transporting direction, there are various arrangements and devices to be employed in the conveyer systems. For instance, a curved conveyer can be utilized for controlling the transporting direction. Also, a guide for guiding the objects to be conveyed in the conveyer system can be employed for controlling the transporting direction. Otherwise, an appropriate pusher can be employed for pushing the objects to translate or switch the transporting direction. Furthermore, control of the transporting direction can be done by utilizing a cross-conveyer.

However, such conventional conveyer systems are not satisfactorily compact and require a relatively wide space which causes difficulty in facilitating conveying in the factory. Moreover, such systems are not sufficiently efficient in conveying the objects.

SUMMARY OF THE INVENTION

Therefore, it is an object of the invention to provide a novel transporting direction controlling device to be employed in a conveyer system.

Another object of the invention is to provide a satisfactorily compact and sufficiently efficient conveyer system which employs the transporting direction controlling device according to the invention.

In order to accomplish the above-mentioned and other objects, a transporting direction controlling or translating device, according to the invention, employs a rotor member having a plane contacting an object to be transferred. The rotor contacts the object at a preselected contact point for exerting a feeding force which is variable relative to the feed direction depending upon the orientation of the contact point.

In one example, the rotor member is rotatably supported by means of a rotary shaft which is tiltable in variable directions for tilting the plane. By the tilting direction of the plane and the rotating direction of the rotor member, the transporting direction can be changed. In the preferred construction, the rotor member comprises a substantially cylindrical or disc-shaped roller with the contacting plane. The roller is adapted to contact the object at a point on the contacting plane. In such a case, the force to feed the object is exerted on the object in tangential direction relative to the circular trace of the contacting point. Therefore, by adjusting the position of the contacting point, at which the contacting point comes in contact with the object, the transporting direction can be changed.

According to one aspect of the invention, a transporting direction controlling device in a conveyer system comprises a rotor having a planar surface to contact an object at a predetermined contacting point thereon for transmitting a feeding force directed toward a desired feed direction to feed the object, means for rotatingly driving the rotor, and means for shifting the contacting point for changing a direction toward which the object is fed.

According to another aspect of the invention, a transporting direction controlling device comprises a rotor means, rotatable about a rotation axis, for conveying the object, the rotor means having a point on an upper surface which is in contact with the object, means for determining an inclination of the upper surface of the rotor means for determining an orientation of the point on the upper surface, and driving means for rotatingly driving the rotor means.

According to a further aspect of the invention, a conveyer system for conveying objects through a curved conveying path, comprises first and second conveyers arranged for defining the conveying path, a transporting direction controlling station formed between the first and second conveyers and connected therebetween for transferring objects transported from the first conveyer to the second conveyer, a plurality of rotor assemblies provided in the transporting direction controlling station for transferring the objects through a predetermined transfer path defined within the transporting direction controlling station, each of the rotor assemblies comprising, a rotor having a planar surface to contact an object at a predetermined contacting point thereon for transmitting a feeding force directed toward a desired feed direction to feed the object, means for rotatingly driving the rotor; and means for shifting the contacting point for shifting the contacting point for changing a direction toward which the object is fed.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
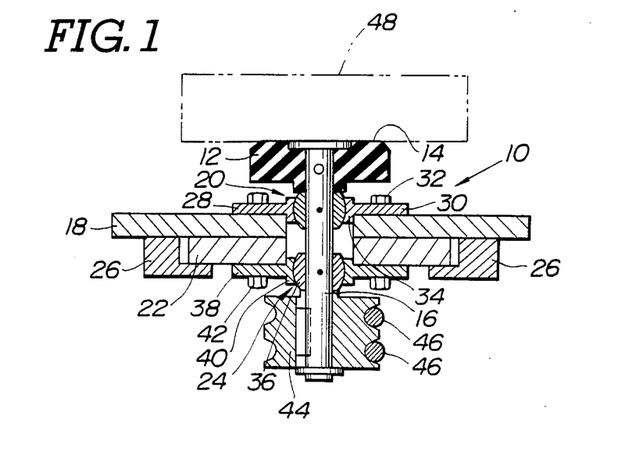
FIG. 1 is a sectional view of the preferred embodiment of a transporting direction controlling device according to the invention.

Referring now to the drawings, particularly to FIG. 1, the preferred embodiment of a transporting direction controlling device which is applicable to a conveyer system, generally comprises a rotor assembly 10. The rotor assembly 10 has a generally cylindrical or disc-shaped rotor 12. The rotor 12 has an upper plane 14 lying substantially perpendicular to the rotary axis thereof. The rotor 12 is fixed onto the top of a rotary shaft 16 for rotation therewith. The rotary shaft 16 extends through a stationary base 18 and is rotatably supported thereon by means of a self-alignment bearing assembly 20. Also, the rotary shaft 16 is supported on a movable plate 22 by means of a self-alignment bearing assembly 24. The movable plate 22 is movably supported beneath the stationary base 18 by means of a guide member 26.

The bearing assembly 20 comprises a bearing ball 28 fixed to the rotary shaft 16 for rotation therewith, and a bearing seat member 30 fixed onto the stationary base 18 by means of fastening bolts 32. The bearing seat member 30 defines a ball rest 34 which conforms with the bearing ball. With the bearing assembly 20, the rotary shaft 16 is pivotably supported with respect to the stationary base. On the other hand, the bearing assembly 24 comprises a bearing ball 36 fixed to the rotary shaft 16 for rotation therewith, and a bearing seat member 38 with the ball rest 40. The bearing seat member 38 is fixed onto the movable plate 22 by means of fastening bolts 42 for movement therewith. Therefore, the rotary shaft 16 is pivotable with respect to the movable plate 22. With the construction set forth above, the rotary shaft 16 is universally pivotable about the bearing assembly 20 according to the position of the movable plate 22.

A driven pulley 44 is fixed to the lower end of the rotary shaft 16 for rotation therewith. The driven pulley 44 is connected to a drive motor (not shown) through a power train including a driving belt 46. Therefore, the rotor 12 is driven by the driving torque transmitted from the driving motor through the driving belt 46, the driven pulley 44 and the rotary shaft 16.

Figure 2:
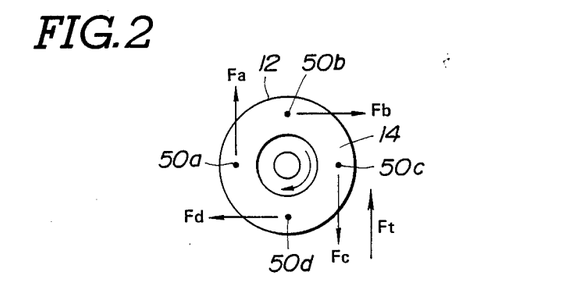
FIG. 2 is a plan view of a rotor in the preferred embodiment of the transporting direction control device.
Figure 3A:
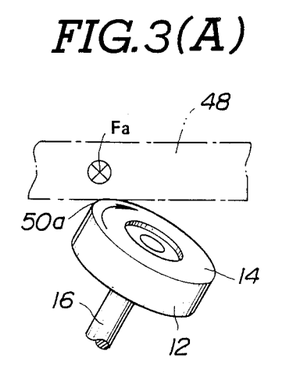
FIGS. 3(A), 3(B), 3(C) and 3(D) are fragmentary perspective views of the rotor.
Figure 3B:
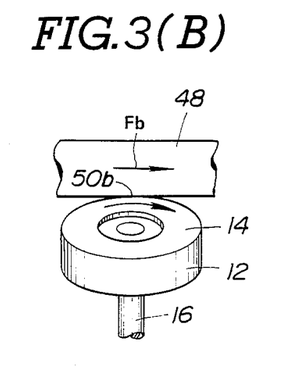
Figure 3C:
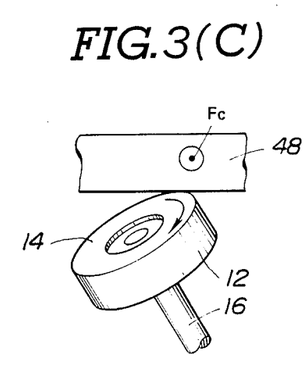
Figure 3D:
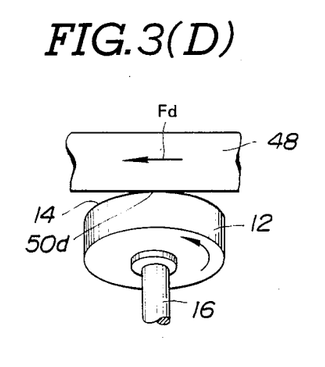

In the preferred embodiment, the rotor 12 is formed of a high friction material, such as rubber, so as to assure control of the transporting direction. However, it would be also possible to form the rotor with a low friction material, such as metal, synthetic resin and so forth. In such case, the high friction material, such as rubber sheet adheres to the upper plane 14. The upper plane 14 of the rotor 12 forms a contacting surface to contact an object 48, such as a product, parts or so forth, to be transferred through the conveyer system. The rotor 12 is tiltable according to the pivoted position of the rotary shaft 16. The upper plane 14 of the rotor 12 is thus tiltable in various tilt directions. The rotor 12 as tilted contacts the object 48 at a contacting point 50 on the upper plane 14 oriented at about the uppermost position. As will be seen from FIG. 2, depending upon the orientation of the contacting point 50, the direction of the force to be exerted onto the object 48 becomes different. Namely, the force to be exerted onto the object 48 is always directed in a tangential direction. Therefore, when the point 50a is positioned at the uppermost position to serve as the contacting point, the force as shown by an arrow Fa is exerted on the object 48 to push the same in the Fa direction. Therefore, assuming the objects transfer direction in the upstream conveyer (not shown) is in a direction Ft, the object 48 is pushed frontwardly by the force Fa at the contacting point 50a, as shown in FIGS. 2 and 3(A). When the point 50b is positioned at the uppermost position to serve as the contacting point, the force as shown by an arrow Fb is exerted on the object 48 to push the same in the Fb direction. Therefore, the object 48 is pushed toward the right by the force Fb at the contacting point 50b, as shown in FIGS. 2 and 3(B). When the point 50c is positioned at the uppermost position to serve as the contacting point, the force as shown by an arrow is Fc exerted on the object 48 to push the same in the Fc direction. Therefore, the object 48 is pushed backward by the force Fc at the contacting point 50c, as shown in FIGS. 2 and 3(C). When the point 50d is positioned at the uppermost position to serve as the contacting point, the force as shown by an arrow Fd is exerted on the object 48 to push the same in the Fd direction. Therefore, the object 48 is pushed toward the left by the force Fd at the contacting point 50d, as shown in FIGS. 2 and 3(D).

Figure 4:
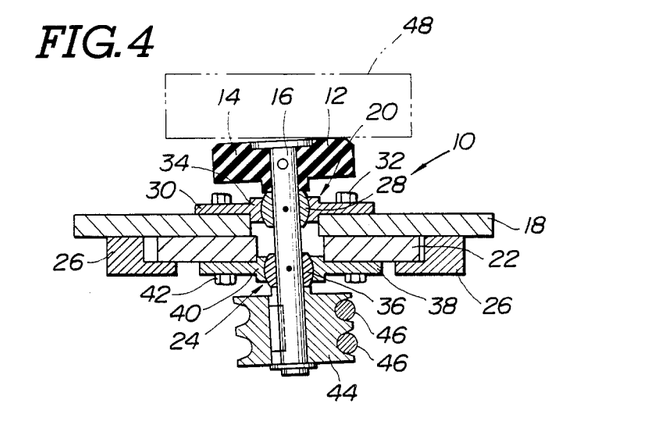
FIG. 4 is a sectional view of the rotor assembly substantially similar to FIG. 1, but showing operating condition thereof.

In order to change the orientation of the contacting point 50, the tilt direction of the upper plane 14 can be changed by pivoting the rotary shaft 16 about the bearing assembly 20. To pivot the rotary shaft 16, the movable plate 22 is shifted in a desired direction by means of an actuator means (not shown) associated thereto. For instance, in the example of FIG. 4, the movable plate 22 is shifted toward the left to incline the rotary shaft 16 toward the right. As a result, the left end portion of positioned at uppermost position to serve as the contacting point 50.

Though the shown embodiment employs the rotary shaft 16 with the rotor 12 tiltable in any tilt direction, it would be possible to specify the tilting directions according to the transporting direction. Furthermore, though the shown embodiment enables control of transporting direction by changing the orientation of the contacting point, it would also be possible to change the transporting direction by switching the rotating direction of the rotor. Namely, when the rotating direction of the rotor 12 in FIG. 2 is reversed to rotate in a counterclockwise direction, the direction of the forces Fa, Fb, Fc and Fd are directed in opposite directions. Therefore, by the combination of the rotor rotating direction and the orientation of the contacting point, the transporting direction can be changed toward various directions. For instance, in the example of FIG. 2, it would be sufficient to switch the orientation of the contacting point between the points 50a and 50b to switch or translate the transporting directions between forward, leftward, backward and rightward directions, by reversing the rotating direction of the rotor 12.

FIGS. 5 through 10 show the preferred and practical embodiment of the conveyer system with the transporting direction controlling station 100. In this embodiment, the objects transferred along the arrow Ta through an upstream conveyer 102 are transferred to a downstream conveyer 104 to transport the object in a direction Tb. As will be seen in FIG. 5, the transporting direction Tb is perpendicular to the direction Ta. Therefore, the transporting direction has to be switched 90° in the transporting direction controlling station 100.

In order to switch the transporting direction, a plurality of rotor assemblies 10 as the transporting direction controlling devices, are arranged in the transporting direction controlling station 100. In the shown embodiment, each of the rotor assemblies 10 in the transporting direction controlling station 100 is provided with a rotor tilt direction for controlling the transporting direction from the Ta direction to Tb direction. The detailed construction of the transporting direction controlling station 100 in the shown embodiment of the conveyer system will be disclosed herebelow with reference to FIGS. 6 to 10.

Figure 6:
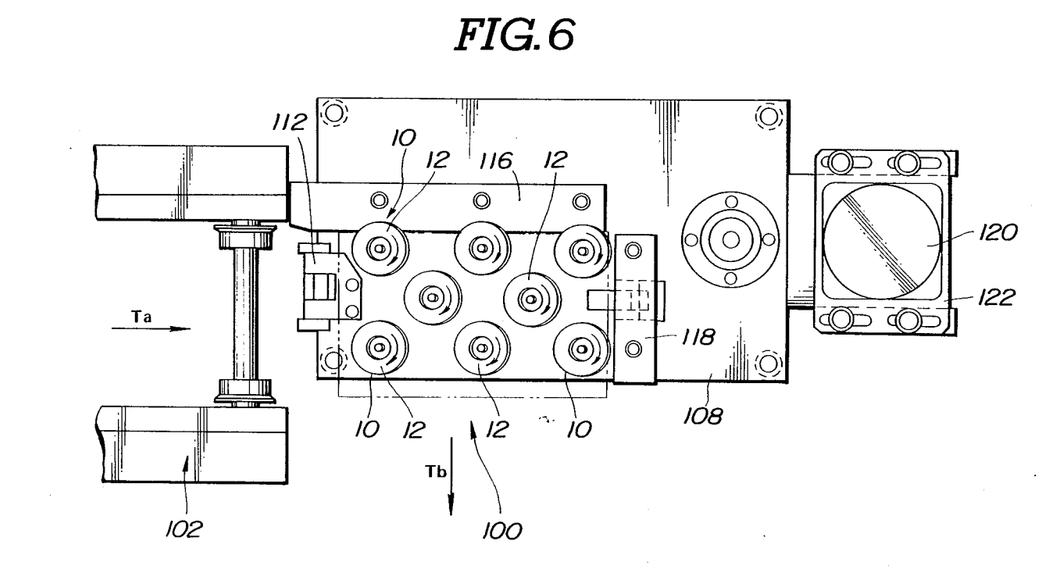
FIG. 6 is a partial plan view of the preferred and practical embodiment of a conveyer system according to the invention.
Figure 7:
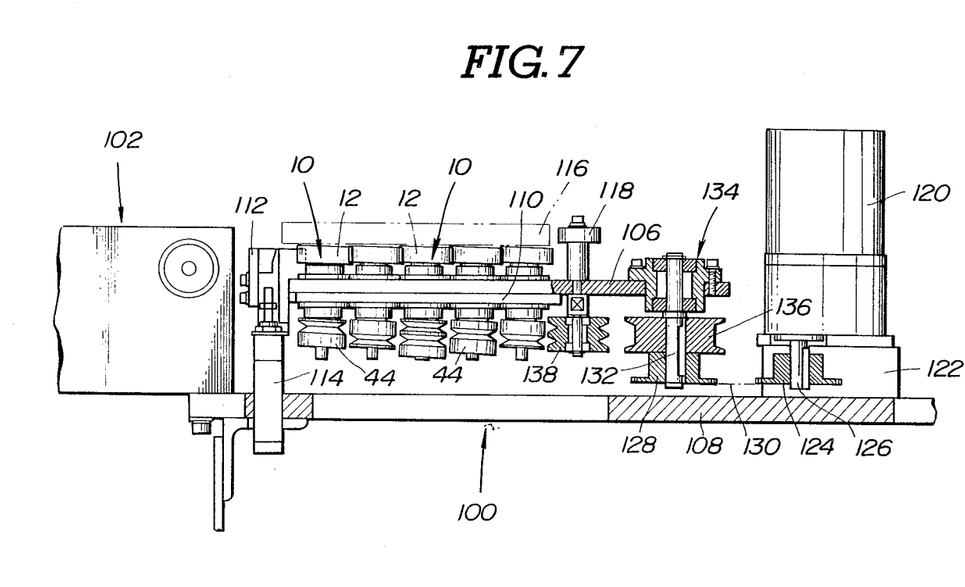
FIG. 7 is a partially-sectioned left side elevation of the conveyer system of FIG. 6.

As shown in FIGS. 6 and 7, the plurality of rotor assemblies 10 are mounted on a common stationary base plate 106. The stationary base plate 106 is fixedly supported on a base 108 through support frames (not shown). Each of the rotor assemblies 10 is a substantially identical construction as that discussed with respect to FIGS. 1 through 4. Therefore, the rotors 12 of the rotor assemblies 10 are arranged on the stationary base plate 106. Also, the rotor assemblies 10 are supported on the movable plate 110 arranged beneath the stationary base plate 106 and movable relative to the stationary base plate. At the upstream end of the transporting direction controlling station 100, a stopper 112 is provided for blocking the objects to be fed thereinto The stopper 112 is associated with an actuation cylinder 114 to be moved up and down. When the actuation cylinder 114 is activated to raise the stopper 112, the stopper blocks the objects to be transported into the transporting direction controlling system. On the other hand, when the actuation cylinder 114 is in its deactivated position, the stopper 112 is placed at its downwardly shifted position to allow the object to enter into the transporting direction controlling station 100.

Guide plates 116 and 118 are also provided above the base plate 106 for defining the transporting path in the transporting direction controlling station 100 for the objects. As will be seen from FIGS. 6 and 7, the guide plate 116 extends perpendicular to the guide 118 for defining a perpendicularly bent transporting path in the transporting direction controlling station.

Figure 8:
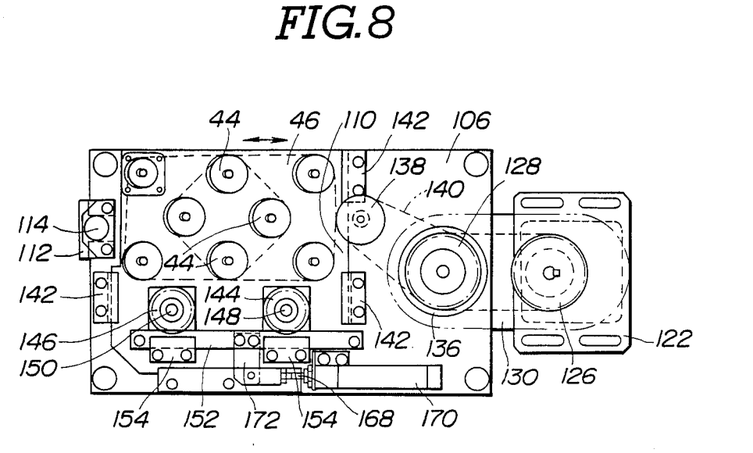
FIG. 8 is a right side elevation of the conveyer system of FIG. 6.
Figure 9:
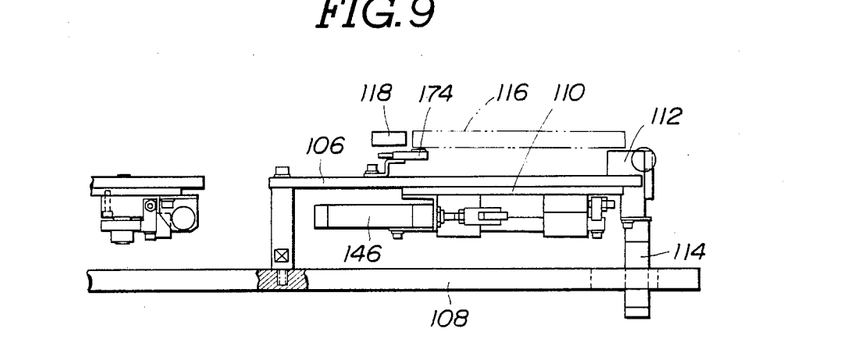
FIG. 9 is a bottom view of the transporting direction controlling device employed in the conveyer system of FIG. 6.

Beneath the movable plate 110, the driven pulleys 44 of the rotor assemblies 10 are arranged. In order to drive the driven pulleys 44 of the rotor assemblies 10, a drive motor 120 is mounted on the base 108 and fixed thereto by means of a mounting bracket 122. A driving sprocket 124 is fixed onto the drive shaft 126 of the drive motor 120 to be driven by the driving torque generated by the motor. The driving sprocket 124 is connected to a power transmission gear 128 via a drive chain 130. The power transmission gear 128 is fixed to a rotary shaft 132 supported on the base plate 106 via a bearing 134. To the rotary shaft 132, a drive pulley 136 is also fixed for rotation therewith. As shown in FIGS. 7 and 8, the drive pulley 136 is connected to an intermediate pulley 138 via a driving belt 140. The intermediate pulley 138 is, in turn, connected to the respective driven pulleys 44 via a driving belt 46. As particularly shown in FIG. 8, a single driving belt 46 is employed for connecting the respective driven pulleys 44. The driving belt 46 is wound around the respective driven pulleys 44 in such a manner that it may drive the respective driven pulleys 44 at the same speed and in the same rotating direction. Therefore, all of the rotors 12 are driven at the same speed and in the same direction.

Figure 10:
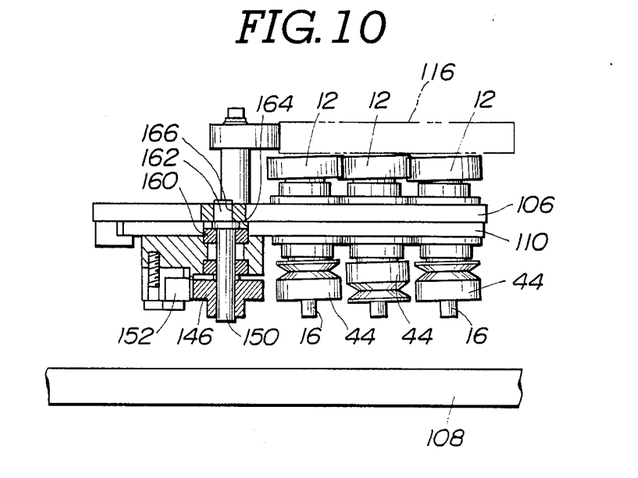
FIG. 10 is partially-sectioned back elevation of the conveyer system of FIG. 6.
Figure 11:
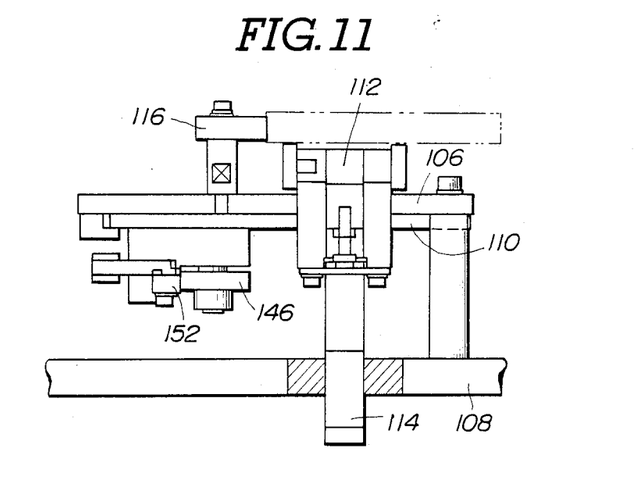
FIG. 11 is a front elevation of a preferred embodiment of the transporting direction controlling device of FIG. 6.

As shown in FIG. 8, the movable plate 110 is movably supported by means of a plurality of guide channels 142 which are rigidly fixed onto the lower surface of the base plate 106. A pair of pinions 144 and 146 are rotatably supported by means of pinion shafts 148 and 150 extending from the movable plate 110. The respective pinions 144 and 146 engage with a rack plate 152 which is thrustingly supported by means of guide channels 154. The guide channels 154 are fixed to the movable plate 110. As shown in FIGS. 8 and 10, eccentric cams 160 are fixed to the pinion shafts 148 and 150 for rotation therewith. The cams 160 have eccentric pins 162 extending upwardly from the upper surface thereof. The eccentric pins 162 are offset from the center axis of the pinion shafts 148 and 150. The cams 160 are firmly engaged with holes 164 formed through the movable plate 110. On the other hand, the top ends of the eccentric pins 162 engage with apertures 166 formed through the stationary base plate 106.

The rack plate 152 is connected to an actuation rod 168 of an actuation cylinder 170 through a connecting bracket 172. Therefore, the rack plate 152 is driven by the actuation cylinder 168 in a direction toward and away from the upstream conveyer 102.

For shifting the movable plate 110, the actuation cylinder 102 is activated to drive the rack plate 152 toward and away from the upstream conveyer 102. By this thrusting movement of the rack plate 152, the pinions 144 and 146 are driven to rotate. Therefore, the pinion shaft 148 and 150 are rotated together with the pinions 144 and 146. Therefore, the cams 160 with the eccentric pins 162 rotate. At this time, since the top end of the eccentric pins 162 are stationarily held by engagement with the aperture 166 of the stationary base plate 106 and the cams 160 are not displaceable relative to the movable plate 110, the movable plate 110 is driven in a direction determined by the angular displacement of the pinions 144 and 146. Therefore, by adjusting the magnitude of the shifting of the rack plate 152, the tilt direction of the rotor 12 can be determined.

In addition, a sensor 174 is provided adjacent the guide plate 118. The sensor 174 detects the object to be transferred approaching the guide plate 118 to produce a sensor signal. The sensor signal triggers a control circuit to start driving of the drive motor 120 and activate the actuation cylinder 170 to tilt the rotors 12 at the tilt direction corresponding to the transfer direction of the object.

Figure 5:
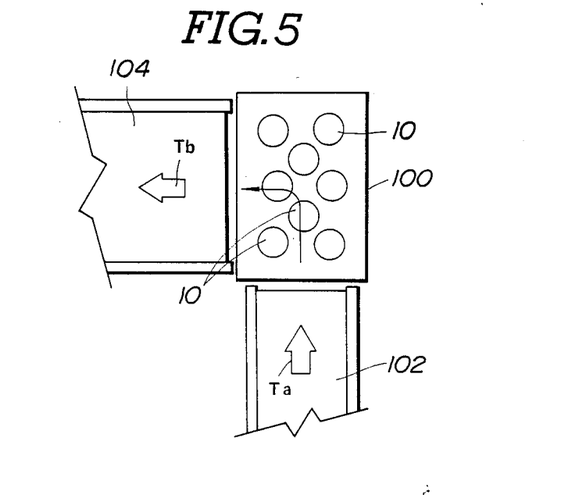
FIG. 5 is a fragmentary perspective view of the preferred and practical embodiment of a conveyer system with a transporting direction controlling device.

In the practical transporting operation, the objects are transported in the Ta direction of FIG. 5 through the upstream conveyer 102 and enter into the transporting direction controlling station 100. At this time, the drive motor 120 is not driven and the actuation cylinder 170 is in the deactivated position to place the movable plate 110 at the initial position. The object moves in the transporting direction controlling station 100 to reach the sensor 174. The sensor 174 then produces the sensor signal to start driving of the drive motor 120 to rotate the rotors 12 and actuate the actuation cylinder to tilt the rotors 12 to the direction corresponding to the transporting direction Tb. In the shown embodiment, the transporting direction is thus translated rightwardly with respect to the Ta direction in the transporting direction controlling station 100. Therefore, assuming the rotors 12 are driven in a clockwise direction in FIG. 6, the rotors have to be inclined or tilted to provide the contacting points 50 to contact with the bottom surface of the object at the rightmost positions in FIG. 6. In order to obtain such tilt direction of the rotors 12, the movable plate 110 has to be shifted toward the upstream conveyer 102 by the actuation cylinder 146. By this, the Tb direction force is exerted onto the objects in the transporting direction controlling station 100 to drive the objects toward the downstream conveyer 104.

When the object supply speed to the transporting direction controlling station 100 is excessively high, then, the actuation cylinder 11 is activated to block the objects in order to provide an appropriate interval between the objects.

Figure 12:
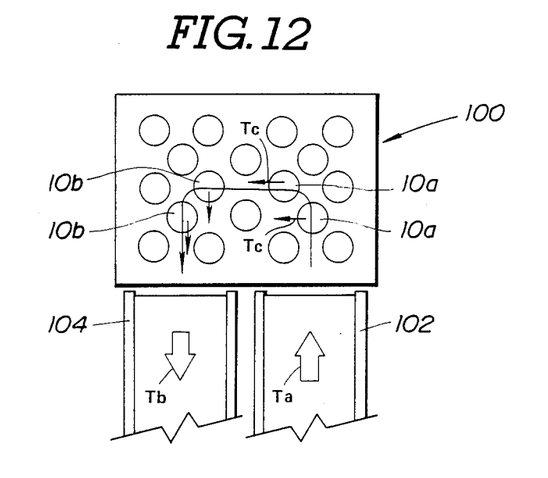
FIGS. 12 through 15 show variations of the transporting direction controlling devices.

Though the aforementioned embodiment is directed to translate the transporting direction at a right angle, the conveyer system according to the invention is not limited to the shown control of the directions. For instance, FIGS. 12 through 15 show various arrangement of the transporting direction controlling stations to be facilitated in the conveyer system of the invention. In the example of FIG. 12, the transporting direction is reversed at the transporting direction controlling station 100 between the upstream and downstream conveyers 102 and 104 which are arranged in a parallel relationship to each other. Namely, in the example of FIG. 12, the object transferred through the upstream conveyer 102 U-turns to be transferred backwardly through the downstream conveyer 104. In this case, the first group of rotors 10a exerts a leftward force to the object and the second group of rotors 10b exerts a backward force to the object.

Figure 13:
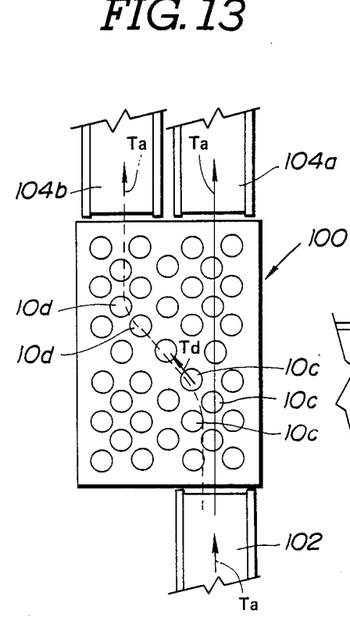

In the example of FIG. 13, the object transferred through the upstream conveyer 102 is selectively transferred to one of the downstream conveyers 104a and 104b through the transporting direction controlling station 100. In this shown example, the downstream conveyer 104a is arranged in alignment with the upstream conveyer 102. Therefore, when the object is to be transferred to the downstream conveyer 104a, the transporting direction controlling station transfers the object in straight. On the other hand, when the object is to be transferred to the downstream conveyer 104b, then the first group of rotors 10c is tilted to translate the transporting direction from the Ta direction to the Td direction and the second group of rotors 10d is tilted to switch the transporting direction from Td to Ta.

Figure 14:
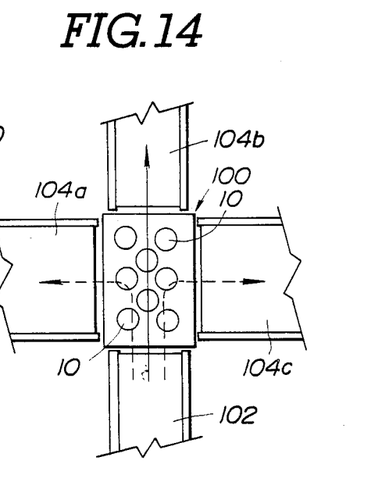

In the example of FIG. 14, the object transferred through the upstream conveyer 102 is transferred to one of the downstream conveyers 104a, 104b and 104c. On the other hand, in the example of FIG. 15, the transporting direction controlling station is provided at a T-junction in the conveyer system to feed the object between three conveyers 104a, 104b and 104c. In these cases, the tilt directions of the rotors 12 will be adjusted to obtain the desired feed directions.

Figure 15:
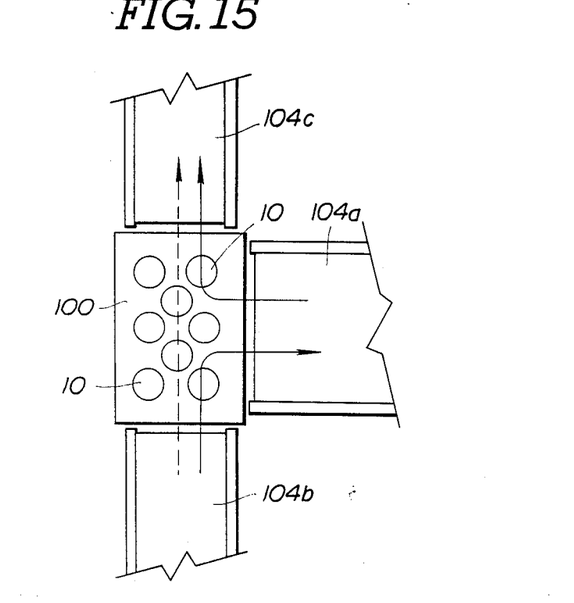
Figure 16:
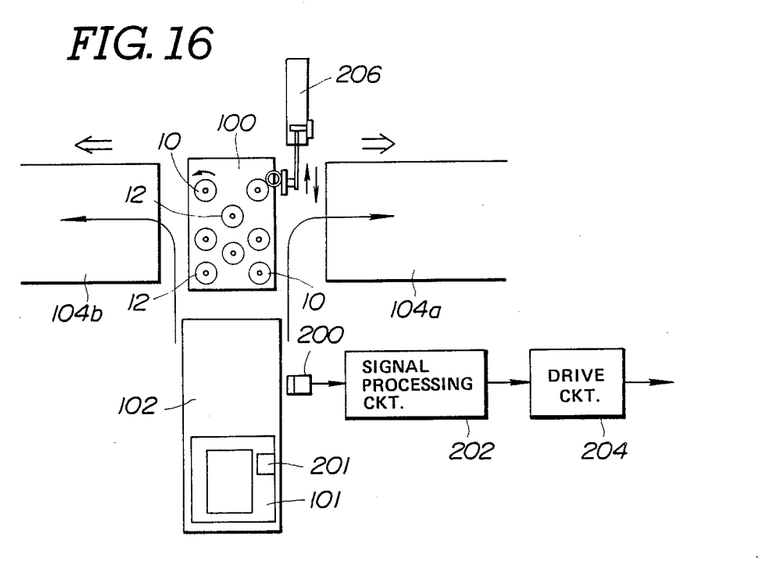
FIG. 16 is a diagramatical illustration showing a modification of the conveyer system of FIGS. 5 through 11, in which objects transferred through the conveyer line are distinguished and selectively fed to different downstream conveyer lines.

FIG. 16 show a modified arrangement which has similar conveyer arrangement as that illustrated in FIG. 15. In this embodiment, the object transferred through the upstream conveyer 102 is checked at a checking station located upstream of the T-junction where the transporting direction controlling station 100 is provided. In the checking station, checking is performed regarding .he respective objects transferred through the upstream conveyer 102. An optically readable marking, such as a bar-code, is put on each object. The marking indicates whether the object is good or not good. If the object is a good one, it is transferred to the downstream conveyer 104a. On the other hand, if the object is not good, it is transferred to the downstream conveyer 104b.

In order to read the marking on the objects, an optical reader or other appropriate sensor 200 is provided adjacent the upstream conveyer 102 and at the location adjacent to the transporting direction controlling station. The sensor 200 reads the data in the marking and feeds the sensor signal to a signal processing circuit 202. The signal processing circuit 202 processes the sensor signal to make a judgment whether the object is good or not good. Based on the result of the judgment, the signal processing circuit 202 produces a transfer direction control signal to a drive circuit 204 for the actuation cylinder 206. The actuation cylinder 206 is designed for adjusting the tilt direction of the rotors 12 in substantially the same manner as that in the former embodiment. Therefore, a good one and not good one are selectively transferred to a corresponding one of the conveyers 104a and 104b. Such a conveyer system will be useful in a product transporting line of automatically removing unsatisfactory products.

Figure 17:
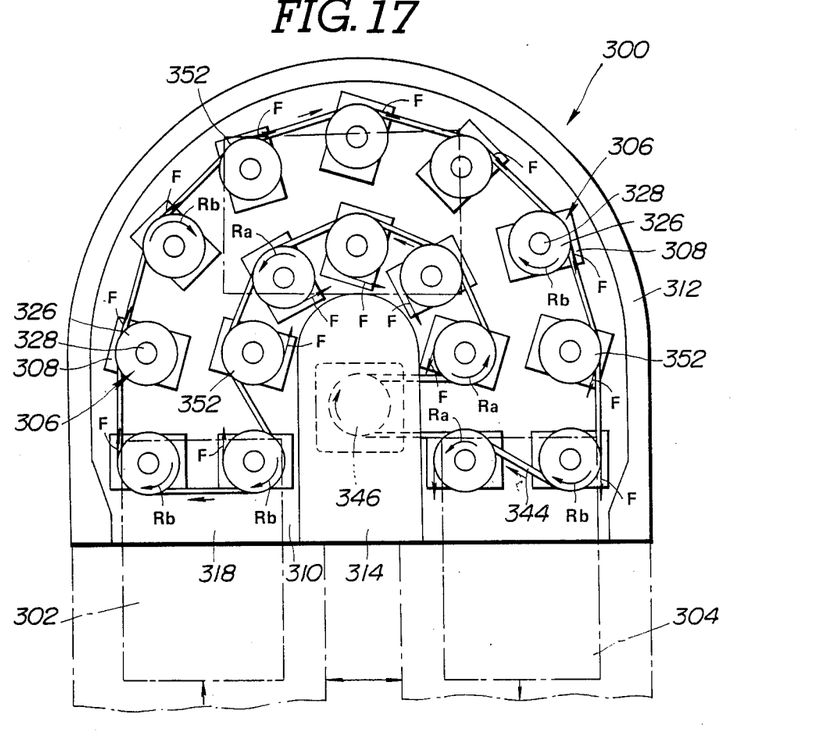
FIG. 17 is a plan view of another embodiment of the conveyer system which employs another embodiment of the transporting direction controlling device of the invention.

FIG. 17 shows another practical embodiment of a conveyer system according to the invention, which facilitates the transporting direction controlling station 300. As will be seen in FIG. 17, the transporting station is disposed between an upstream conveyer 302 and a downstream conveyer 304. The upstream and downstream conveyers 302 and 304 are arranged in a parallel relationship to each other. The transporting controlling station 300 defines essentially a U-shaped path for the objects in order to transfer the objects transporting through the upstream conveyer 302 in the Ta direction to the downstream conveyer 304 which transports the objects in the Tb direction.

A plurality of rotor assemblies 306 are provided in the transporting direction controlling station 300. The rotor assemblies 306 are supported on rotor bases 308 projected on a base plate 310. The base plate 310 is formed into an essentially semicircular shaped configuration with a substantially straight extension. A outer guide wall 312 extends along the outer peripheral edge of the base plate 310. On the other hand, an inner guide member 314 is supported above the base plate 310 by means of a plurality of support frames 316. The outer guide wall 312 and the inner guide member 314 cooperate with each other to define an essentially U-shaped path 318 for the objects to be transferred through the transporting direction controlling station 300.

Figure 18:
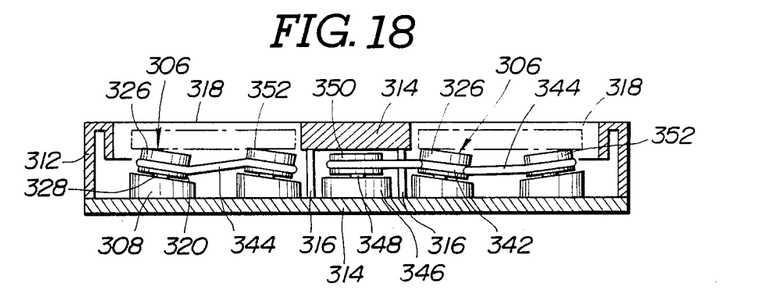
FIG. 18 is a section of the transporting direction controlling station in the conveyer system of FIG. 17.
Figure 19:
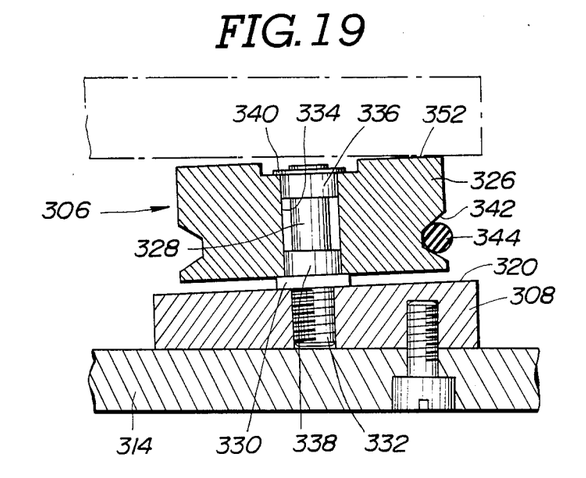
FIG. 19 is an enlarged section of a rotor assembly to be employed in the transporting direction controlling device of FIG. 17.

As shown in FIGS. 18 and 19, each of the rotor bases 308 has an inwardly inclined upper surface 320. Each of the rotor assemblies 306 is mounted on the upper surface 320 of the rotor base 308. The rotor assembly 306 comprises a rotor 322 having an upper plane 324. The rotor 326 is supported by means of a rotor shaft 328. Therefore, the rotor 326 is rotatable about the rotor shaft 328. The rotor shaft 328 has a lower threaded section 332 engageable with a threaded opening formed through the rotor base 308. The threaded opening of the rotor base 308 is formed to extend its axis substantially perpendicular to the upper surface 320 of the rotor base. Therefore, the rotor shaft 328 extends substantially perpendicular to the upper surface 320 of the rotor base. In other words, the rotor shaft 328 extends oblique to the horizontal plane to incline inwardly. The rotor shaft 328 also has a flange section 330 which has larger diameter than that of a through opening 334 formed through the rotor 326. Also, the rotor shaft 328 has essentially cylindrical extensions 336 and 338 having substantially smooth outer peripheries. The cylindrical extensions 336 and 338 mate with the inner periphery of the through opening of the rotor 326 for allowing smooth rotation of the rotor thereabout. A retainer clip 340 engages with the top of the rotor shaft 328 of retaining the rotor 328 in place.

The rotor 326 is formed with an essentially V-shaped groove 342 around the periphery. This V-shaped groove 342 serves for receiving a driving belt 344 for transmitting driving torque of a drive motor 346 which is mounted on the base plate 310 and located beneath the inner guide member 314. The drive motor 346 has a drive shaft 348, to which a drive pulley 350 is fixed. The driving belt 344 is wound around the drive pulley 350 to be driven by the driving torque of the drive motor 346.

Returning to FIG. 17, the first group of rotor assemblies 306 is arranged substantially along the outer guide wall 312. The second group of rotor assemblies 306 is arranged substantially along the inner guide member 314. As will be seen from FIG. 17, the driving belt 344 is wound around respective rotors 306 for driving them in desired directions. In the shown embodiment, the driving motor is driven in a clockwise direction. Then, the driving belt 344 drives the rotors 306 which are arranged along the curved portion of the inner guide member 314 in a counterclockwise direction, as indicated by the arrow Ra. On the other hand, the driving belt 344 drives the first group of rotors 306 and the one of the rotor in the second group located adjacent the inlet end of the transporting direction converting station, in a clockwise direction, as indicated by the arrow Rb. Further, the driving belt 344 drives the rotor 306 in the second group and located adjacent the outlet end of the transporting direction controlling station 300 in a counterclockwise direction, as indicated by the arrow Ra. With the shown arrangement, the respective rotors 306 contact the object at respective contact points 352 to exert a force to the object travelling along the U-shaped transfer path in the transporting direction controlling station 300 in directions indicated by the arrow F.

As will be seen from FIG. 17, the force as indicated by the arrow F is directed slightly inward to force the object in the transporting direction controlling station 300 forward and inward. By providing a tendency to inwardly force the objects transferred through the transporting direction controlling station 300, the required curve diameter can be shortened to allow the transporting direction controlling station to be made satisfactorily compact.

Figure 20:
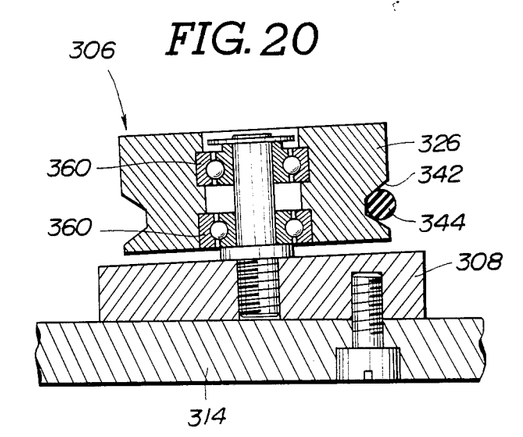
FIG. 20 is an enlarged section of a modified embodiment of the rotor assembly.

FIG. 20 shows a modified construction of the rotor assembly 306 to be employed in the conveyer system of FIG. 17. In this modification, the rotor 326 is supported by the rotor shaft 328 through ball bearings 360 instead of utilizing metal contact.

Figure 21:
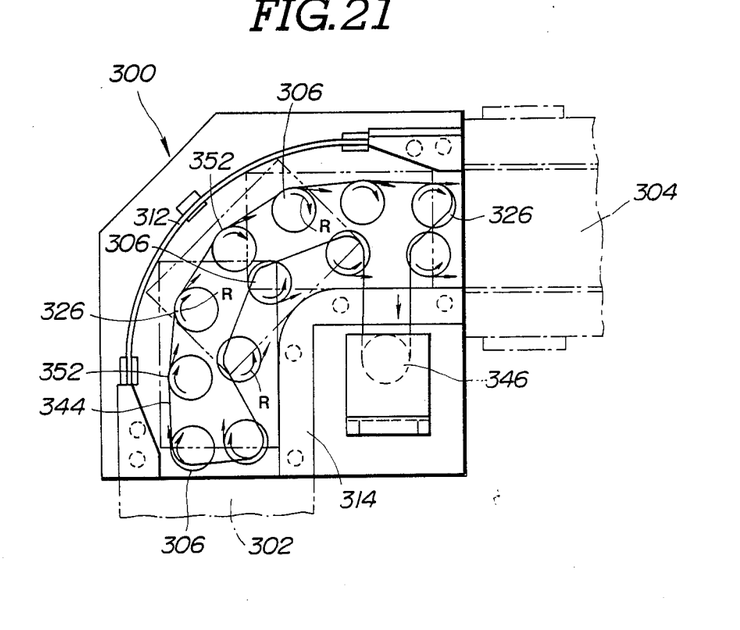
FIG. 21 is a plan view of a further embodiment of the conveyer system according to the invention.
Figure 22:
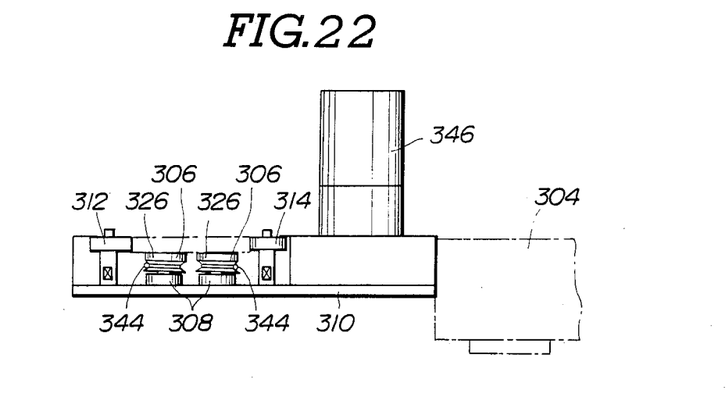
FIG. 22 is a side elevation of the conveyer system of FIG. 17.

FIG. 21 and 22 show a further practical embodiment of the conveyer system according to the invention, which employs the transporting direction controlling station 300 for transferring the object transporting through the upstream conveyer 302 to the downstream conveyer 304 which is oriented substantially perpendicular to the upstream conveyer. Therefore, the transporting direction controlling station 300 switches the transporting direction at about 90° from the direction Ta to the direction Tb. Similarly to the foregoing embodiment, the outer guide wall 312 and the inner guide member 314 are provided for defining the 90° bent transferring path in the transporting direction controlling station 300. The rotor assemblies 306 are arranged substantially along the outer guide wall 312 and the inner guide member 314. Each of the rotor assemblies 306 are of substantially identical construction as that illustrated in FIG. 19 or FIG. 20 and supported on the rotor base 308 protruding on the base plate 310. Respective rotors 326 of the rotor assemblies 306 are driven by the driving torque of the drive motor 346 through a driving belt 344. As seen from FIG. 21, the respective rotors 326 rotate as indicated by arrow R and contact to the object at contact points 352. Therefore, a forward and inward driving force to feed the objects is exerted to the object. Similarly to the former embodiment, the curve radius of transferring path can be shortened to make the transporting direction controlling station compact enough.

As set forth above, the transporting direction controlling device, according to the invention, successfully translates the transporting direction in the conveyer system. Since the transporting direction controlling device can change the transporting direction by changing the contact point between the rotating rotor and the object to be transferred, switching of the transporting direction can be done by simply changing the tilt direction of the rotor.

What is claimed is:

1. A transporting direction controlling device comprising:
   a rotor means, rotatable about a rotation axis, for conveying an object, said rotor means having a planar upper surface substantially perpendicular to said rotation axis, said planar upper surface defining a circumferential edge, and a point on said circumferential edge in contact with said object;
   means for inclining said upper surface of said rotor means for determining an orientation of said point on said circumferential edge; and
   driving means for rotatingly driving said rotor means, wherein said inclining means includes a rotor shaft rotatably supporting said rotor means; said rotor shaft is tiltable about the vertical axis for tilting said upper surface, rotatable with said rotor means, and rotatably supported on a stationary member via a first bearing; and said first bearing has a rotation axis, the rotation axis of said first bearing being coaxial with the rotation axis of said rotor means in all dispositions of said rotor means.

2. A transporting direction controlling device as set forth in claim 1, wherein said rotor shaft mounts a pulley connected to a drive motor via a driving belt.

3. A transporting direction controlling device as set forth in claim 1, wherein said rotor means determines the direction of said feeding force by a rotating direction of said rotor means and an orientation of said contact point.

4. A transporting direction controlling device as set forth in claim 3, wherein said rotor means exerts the feeding force in a tangential direction at the contact point.

5. A transporting direction controlling device as set forth in claim 1, wherein said rotor means is tiltable with respect to a vertical axis so as to determine said contact point.

6. A transporting direction controlling device as set forth in claim 5, wherein said contact point of said rotor means is oriented at the point located at an uppermost position.

7. A transporting direction controlling device as set forth in claim 6, wherein a tilt direction of said rotor means is variable for shifting said orientation of said contacting point to switch the direction of said feeding force.

8. A transporting direction controlling device as set forth in claim 1, wherein said shaft is further rotatably mounted on a movable member via a second bearing.

9. A transporting direction controlling device as set forth in claim 8, wherein said movable member is movable relative to said stationary member for causing displacement of said second bearing relative to said first bearing for causing a change of a tilt direction of said rotor shaft.

10. A conveyor system for conveying objects through a conveying path, comprising:
first and second conveyors arranged for defining said conveying path;
a transporting direction controlling station formed between said first and second conveyors and connected therebetween for transferring objects transported from said first conveyor to said second conveyor;
a plurality of rotor assemblies provided in said transporting direction controlling station for transferring said objects through a predetermined transfer path defined within said transporting direction controlling station, each of said rotor assemblies comprising
a rotor having a planar surface to contact with an object at a predetermined contacting point thereon for transmitting a feeding force directed toward a desired feed direction to feed the object;
means for rotatingly driving said rotor;
means for shifting said contacting point for changing a direction toward which said object is fed; and
a rotor shaft rotatably supporting said rotor, wherein said rotor shaft is tiltable about a vertical axis for tilting the planar surface, rotatable with said rotor, and rotatably supported on a stationary member via a first bearing and on a movable member via a second bearing; said movable member is movable relative to said stationary member for causing displacement of said second bearing relative to said first bearing for causing a change of a tilt direction of said rotor shaft; and said stationary member is positioned between said movable member and said planar surface of said rotor.

11. A conveyor system as set forth in claim 10, wherein said rotor assemblies are arranged along said transfer path.

12. A conveyor system as set forth in claim 10, wherein said rotor of each of said rotor assemblies determines the orientation of said contacting point for exerting said feeding force in a direction substantially along said transfer path.

13. A conveyor system as set forth in claim 10, wherein said driving means for driving respective rotor comprise a common drive motor and a common drive belt.

14. A conveyor system as set forth in claim 10, wherein said rotor determines the direction of said feeding force by a rotating direction of said rotor and an orientation of said contact point.

15. A conveyor system as set forth in claim 14, wherein said rotor exerts the feeding force in a tangential direction at the contacting point.

16. A conveyor system as set forth in claim 10, wherein said rotor is tiltable with respect to a vertical axis so as to determine said contacting point.

17. A conveyor system as set forth in claim 16, wherein said contacting point of said rotor is oriented at the point located at an uppermost position.

18. A conveyor system as set forth in claim 17, wherein a tilt direction of said rotor is variable for shifting said orientation of said contacting point to switch the direction of said feeding force.

19. A conveyor system as set forth in claim 10 further comprising:
a third conveyor arranged for defining said conveyor path, said transporting direction controlling station being formed among said first, second and third conveyors and connected thereamong for transferring objects transported from said first conveyor to said second and third conveyors; and
means for checking objects and distinguishing a first group of said objects which is to be transferred through said second conveyor and a second group of said objects which is to be transferred through said third conveyer, wherein said means for shifting said contacting point for transferring said first group of objects to said second conveyor and said second group of objects to said third conveyor shifts said contacting point according to the group distinguished by said checking means.

20. A conveyer as set forth in claim 19, wherein said checking means produces a signal representative of one of said first and second groups according to said information for controlling operation of said shifting means.

21. A conveyer system for conveying objects through a conveying path, comprising:
first, second and third conveyors arranged for defining said conveyer path;
a transporting direction controlling station formed among said first, second and third conveyors and connected thereamong for transferring an object transported from said first conveyer to one of said second and third conveyers;

sensing means for detecting information about said transferring object;

a plurality of rotor assemblies provided in said transporting direction controlling station for transferring said object through a predetermined transfer path defined within said transporting direction controlling station, each of said rotor assemblies comprising a rotor, rotatable about a rotation axis, for conveying the object, said rotor having a planar upper surface substantially perpendicular to said rotation axis, said planar upper surface defining a circumferential edge to contact said object at a predetermined contacting point on said circumferential edge for transmitting a feeding force directed toward a desired feed direction to feed the object;

means for rotatingly driving said rotor; and means for shifting said contacting point in response to the information about said transferring object sensed by said sensing means in order to change a direction toward which said object is fed; and a rotor shaft rotatably supporting said rotor, wherein said rotor shaft is tiltable about the vertical axis for tilting said planar surface, rotatable with said rotor, and rotatably supported on a stationary member via a first bearing;

and said first bearing has a rotation axis, the rotation axis of said first bearing being coaxial with the rotation axis of said rotor in all dispositions of said rotor.

* * * * *